United States Patent [19]
Steinberger

[11] Patent Number: 5,205,691
[45] Date of Patent: Apr. 27, 1993

[54] SCREW STABILIZER

[76] Inventor: Richard N. Steinberger, 153B Jackson Ave., New Windsor, N.Y. 12553

[21] Appl. No.: 804,565

[22] Filed: Dec. 10, 1991

[51] Int. Cl.⁵ ............................................. F16B 39/24
[52] U.S. Cl. .................... 411/147; 411/149; 411/330; 411/371; 411/531
[58] Field of Search ............... 411/160, 534, 368, 371, 411/383, 396, 531, 533, 537, 147, 132, 149, 138, 136, 330

[56] References Cited

U.S. PATENT DOCUMENTS

| | | | |
|---|---|---|---|
| 531,024 | 12/1894 | Dolan | 411/132 X |
| 676,939 | 6/1901 | Eveland | 411/534 X |
| 738,217 | 9/1903 | Love. | |
| 1,066,761 | 7/1913 | Semon et al. | |
| 1,250,241 | 12/1917 | Stafford et al. | |
| 1,263,489 | 4/1918 | Turbett. | |
| 1,739,476 | 12/1929 | Andersson. | |
| 1,928,182 | 9/1933 | Mahoney | 411/534 |
| 2,112,494 | 3/1938 | Olson. | |
| 2,128,844 | 8/1938 | Myer et al. | 411/534 X |
| 3,417,802 | 12/1968 | Oldenkott. | |
| 4,708,555 | 11/1987 | Terry. | |

FOREIGN PATENT DOCUMENTS

| | | | |
|---|---|---|---|
| 386114 | 6/1908 | France. | |
| 1262330 | 4/1961 | France | 411/147 |
| 415640 | 9/1947 | Italy | 411/531 |
| 21570 | 11/1894 | United Kingdom | 411/531 |
| 10079 | 4/1910 | United Kingdom. | |

Primary Examiner—Rodney M. Lindsey

[57] ABSTRACT

A screw stabilizer for selectively adjusting a first element with respect to a second element. The screw stabilizer includes a screw having a first end adapted to be supported on the first element and a second threaded end to be adapted to be threaded to the second element. First and second opposing washers are supported on the first end of the screw. The first washer includes a plurality of radially extending detents on the inner surface thereof. A plurality of ball bearings are sandwiched intermediate the first and second washers. The first end of the screw presses the first and second washers towards one another. The ball bearings selectively ride in the detents to selectively, releasably lock the screw in a desired position.

36 Claims, 5 Drawing Sheets

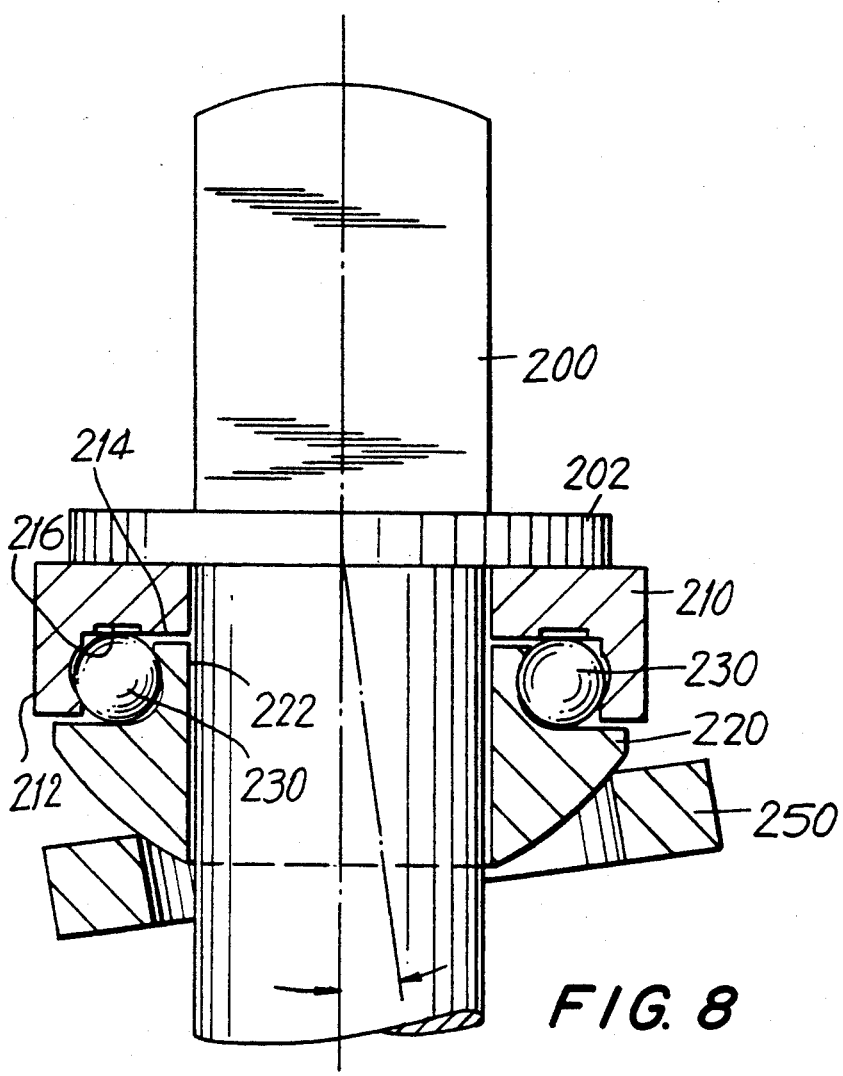
FIG. 8
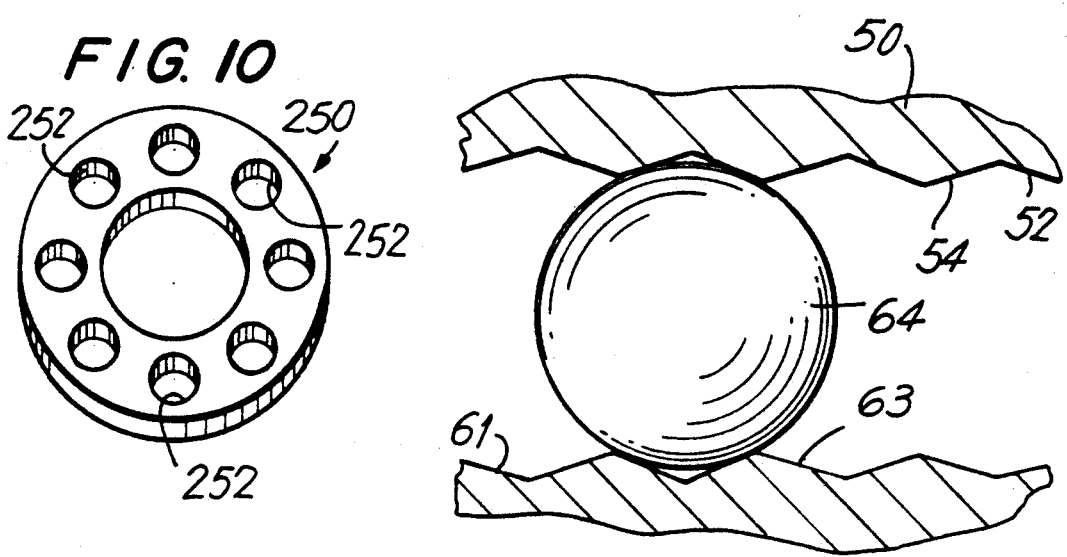
FIG. 10
FIG. 9

SCREW STABILIZER

BACKGROUND OF THE INVENTION

The present invention is directed generally to a screw stabilizer and, in particular, to a screw stabilizer which prevents the undesired loosening of a screw, particularly adapted for use, for example, in the tightening of a drum head on a drum using lug screws.

In many applications, it is desired to prevent the undesired loosening of a screw which is used to tighten or adjust one element or work piece with respect to another element or work piece. Often, vibration or other environmental factors cause the screw or other fastening means to loosen causing unwanted effects. For example, the head of a drum is selectively tightened on the shell or body of the drum by means of lug screws to place the desired tension on the drum head. Once set, vibration caused by beating on the drum may cause loosening of the lug screws.

In such a drum construction, a plurality of lug nuts are secured around the outer circumference of the drum shell. Each lug nut includes a threaded opening therein. The drum head is secured to a rim which includes an opening in alignment with each of the lug nuts. A lug screw extends through each opening in the rim and is threaded to a respective lug nut. The lug screw is tightened against the rim to stretch the drum head to the desired degree. As a drummer plays the drum, the vibration causes the lug screw to loosen thereby requiring re-tightening of the drum head at relatively frequent and undesirable intervals.

Accordingly, it is desired to provide a screw stabilizer which prevents loosening of a screw while permitting easy adjustment thereof.

SUMMARY OF THE INVENTION

Generally speaking, in accordance with the present invention, a screw stabilizer for selectively adjusting a first element with respect to a second element, is provided. The screw stabilizer includes a screw having a first end adapted to be supported on the first element and a second threaded end adapted to be threaded to the second element. First and second opposing washers are supported on the first end of the screw. The first washer includes a plurality of radially extending detents on the inner surface thereof. A plurality of ball bearings are sandwiched intermediate the first and second washers. The first end of the screw presses the first and second washers towards one another. The ball bearings selectively ride in the detents to selectively, releaseably lock the screw in a desired position. The tighter the screw, the tighter the locking since the tension on the device is greater.

The detents are preferably formed as alternating sloping surfaces to permit indexing whereby the ball bearings alternately engage the angled surfaces. In a preferred embodiment, the first washer is fixed on the lug screw so as to rotate therewith. The second washer includes an outer sloped or curved surface which presses against the first element. The inner surface of the second washer may also include a plurality of opposing detents surfaces. The detents provide discrete segment intervals which can be used to index the position of the screws and to permit measurement of changes.

Accordingly, it is an object of the present invention to provide a screw stabilizer.

Another object of the present invention is to provide a device for locking a screw in a desired position, while permitting ready adjustment thereof.

A further object of the present invention is to provide a lug screw stabilizer which prevents the loosening of a drum head with respect to the body of a drum.

A still further object of the present invention is to provide an improved detent bearing assembly for selectively, releaseably locking a screw in a desired position.

Yet another object of the invention is to provide a screw stabilizer for locking a screw in discrete indexed positions to permit control of the position of the screw.

Another object of the invention is to provide a screw stabilizer which is also operative with non-aligned or non-parallel surfaces.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 8 is a partial sectional view depicting an alternative embodiment of a lug screw stabilizer in accordance with the present invention;

FIG. 9 is a partial sectional view similar to FIG. 5 showing an alternative construction of the present invention; and FIG. 10 is a perspective view of a discrete bearing separator for use in connection with the present invention.

DETAILED DESCRIPTION OF THE PREFERRED EMBODIMENTS

Figure 1:
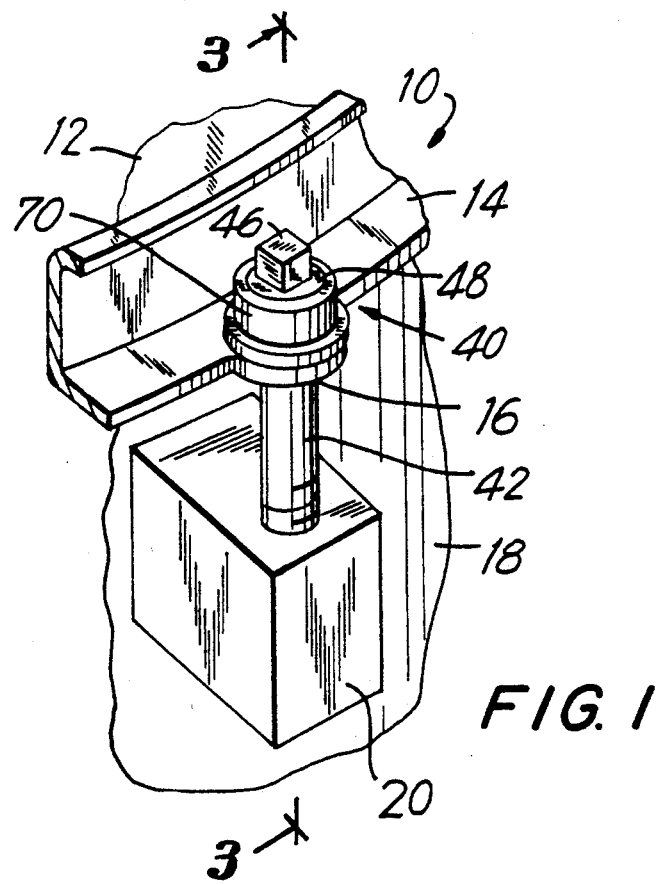
FIG. 1 is a perspective view of a portion of a drum incorporating a lug screw stabilizer constructed in accordance with a preferred embodiment of the present invention.
Figure 2:
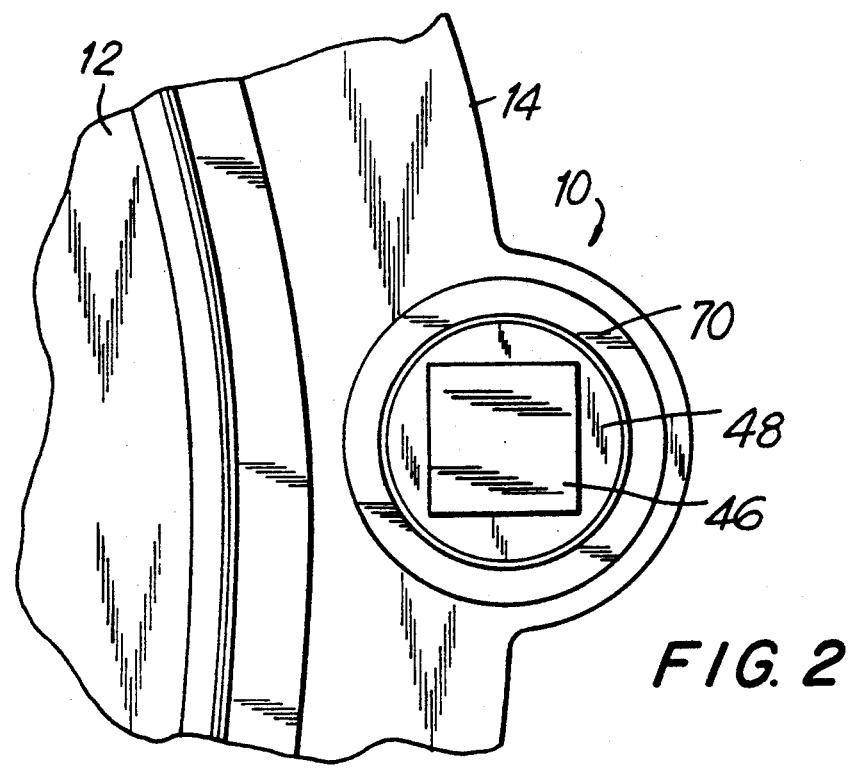
FIG. 2 is a top plan view of the drum head portion depicted in FIG. 1.

Reference is first made to FIGS. 1 and 2 which depict a drum, generally indicated at 10, including a screw stabilizer generally indicated at 40, and constructed in accordance with a preferred embodiment of the present invention. Drum 10 includes a drum head 12 secured to a rim 14. Rim 14 includes a plurality of openings 16 one of which is depicted in FIG. 1. Drum 10 also includes a circular shell or body 18 having a plurality of lug nuts 20 secured thereto, one of which is depicted in FIG. 1.

A lug screw 42 extends through opening 16 in rim 14 and is threaded into lug nut 20.

Figure 3:
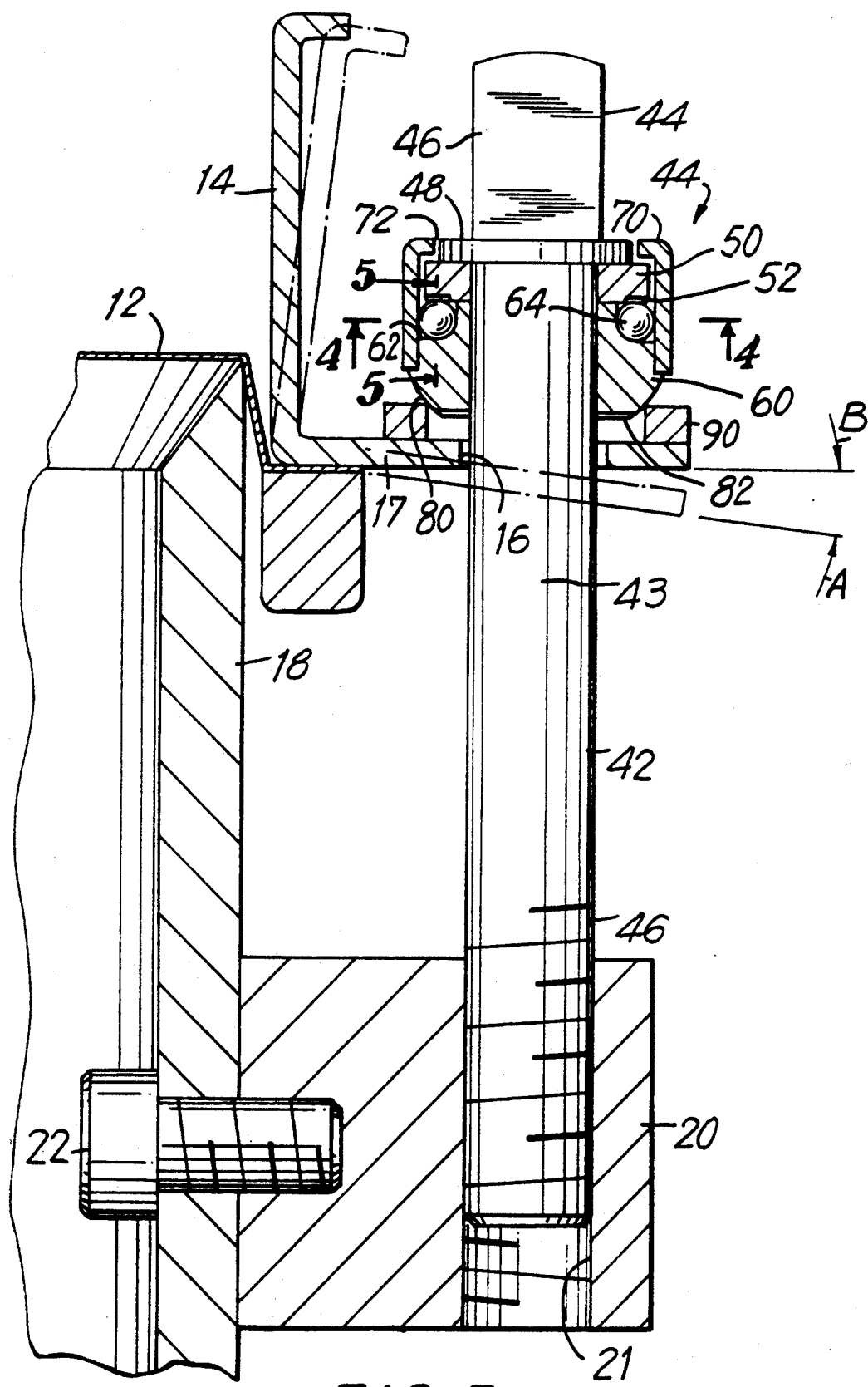
FIG. 3 is an enlarged sectional view taken along line 3—3 of FIG. 1.

Referring now additionally to FIG. 3, it is seen that lug nut 20 is supported on drum shell 18 through a screw 22, although it is recognized that other fastening devices may be used. It is noted that a plurality of lug nuts 20 would be provided around the circumference of shell 18 in alignment with each opening 16 in rim 14. In a conventional drum, a lug screw is inserted through opening 16 in rim 14 and includes a head which is larger than opening 16. The screw would be threaded into lug nut 20 and adjusted by a drum key, wrench or the like to stretch head 12 to the desired tension. As drum head 12 is played by the drummer, the screws will have a tendency to loosen due to the vibration caused by beating on the drum. The present invention as described in detailed hereinafter allows easy adjustment of the lug screw to a desired position but then releaseably locks the lug screw in any desired position until manually changed.

Screw 42 includes a first end 44 and a second end 46. Second end 46 is threaded for engagement in corresponding threaded opening 21 of lug nut 20. First end 44 of screw 42 includes an upper rectangular head 46 adapted to receive a drum key, wrench or the like for manual tightening or loosening of screw 42. First end 44 also includes an enlarged head ring 48.

Figure 4:
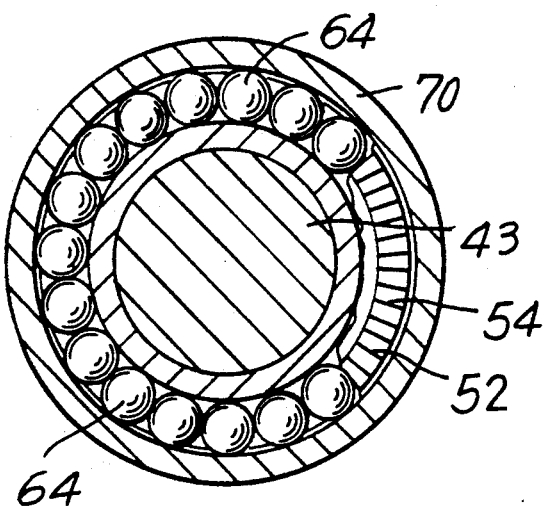
FIG. 4 is an enlarged sectional view taken along line 4—4 of FIG. 3.
Figure 5:
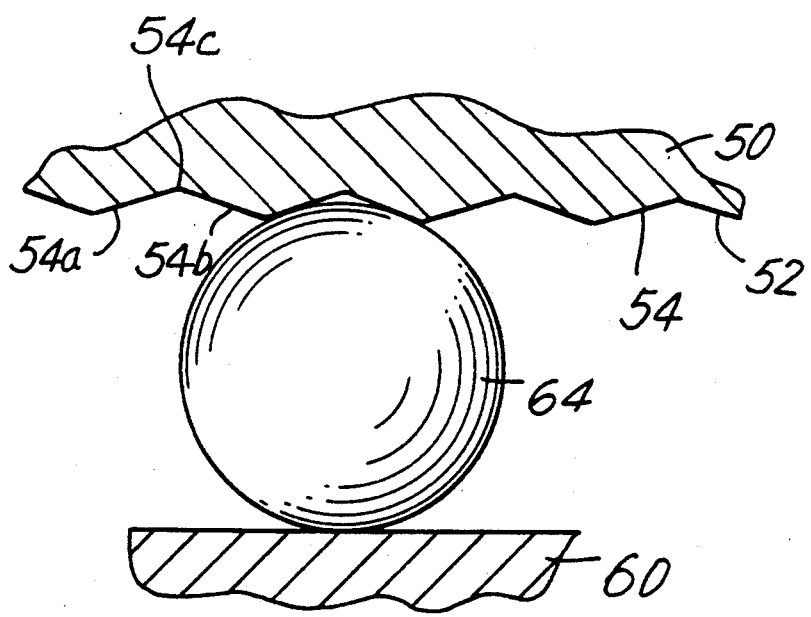
FIG. 5 is an enlarged sectional view taken along line 5—5 of FIG. 3.

A first washer 50 is press fitted on shaft 43 of screw 42 adjacent head ring 48 and is adapted to rotate with shaft 43. It is noted that first washer 50 may be integrally formed on shaft 43 of screw 42. As best depicted in FIGS. 4 and 5, inner surface 52 of washer 50 includes a plurality of radially extending detents 54 extending therearound. Each detent includes inclined walls or angled surfaces 54a and 54b each pair of which defines a peak 54c.

A second or base washer 60 is slip fitted on shaft 43 of screw 42 such that screw 42 can turn with respect thereto. Base washer 60 includes a recessed annular region 62 in which are received a plurality of ball bearings 64. A retainer cover 70 having an opening 72 larger than head ring 48 is secured to base washer 60 as best depicted in FIG. 3 to hold ball bearings 64 intermediate upper washer 50 and base washer 60.

Figure 6:
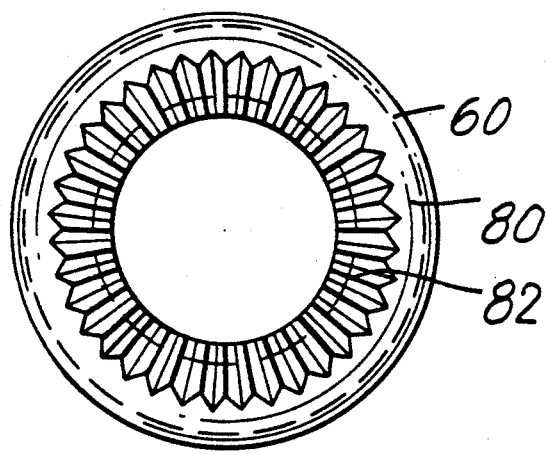
FIG. 6 is a bottom plan view of the base washer of the assembly depicted in FIG. 3.

Base washer 60 includes an outer lower surface 80 which is curved as depicted and terminates in a truncated bottom surface 82 which is knurled or scored therearound as best depicted in FIG. 6. A seat washer 90 is supported intermediate chamfered surface 80 of base washer 60 and flange 17 of drum rim 14.

In operation, screw 42 is tightened in lug nut 20 by turning head 44 with an appropriate drum key or wrench. Since upper washer 50 is fixed to rotate with shaft 43 of screw 42 and base washer 60 rotates freely with respect to shaft 43, detents 54 will ride over and click with respect to ball bearings 64. The ball bearings will alternately engage the angled surfaces defining the detents. When turning is stopped, the ball bearings will settle in a respective detent 54 causing lug screw 42 to remain in this position. The slope of the detents defined by walls 54a and 54b prevents loosening of screw 42 while the drum is being played due to vibrations or other causes. However, manual force may be used to overcome the ball bearing-detent configuration to provide for desired readjustment.

In a preferred embodiment, thirty two detents (opposing sloped surfaces) are provided in upper washer 50 and sixteen ball bearings are utilized. The effective slope of each detent should be larger than the slope of the screw threads on lug screw 42, yet small enough so as not to overcome the static friction between top washer 50 and lug screw 42 or bottom washer 60 and flange 17 of rim 14 through seat washer 90. The effective slope of the detent washer may be defined as follows:

1. Thread pitch ÷ number of positions ÷ 2 = height of detent;
2. Circumference of ball rotation around washer ÷ number of detents ÷ 2 = length of detent slope; and
3. Length of slope ÷ height of detent = minimum detent slope.

By providing multiple facets with slopes in both directions, grooves are formed that act like a ratchet so that the ball bearings will also seek the peak 54c of a groove and lock in that position. The grooves or angled surfaces also allow for indexing the lug screw so that desired change in position can be measured and regulated. In addition, as the lug screw is tightened, more pressure will be exerted on the screw stabilizer to hold the screw more tightly in position.

Figure 7:
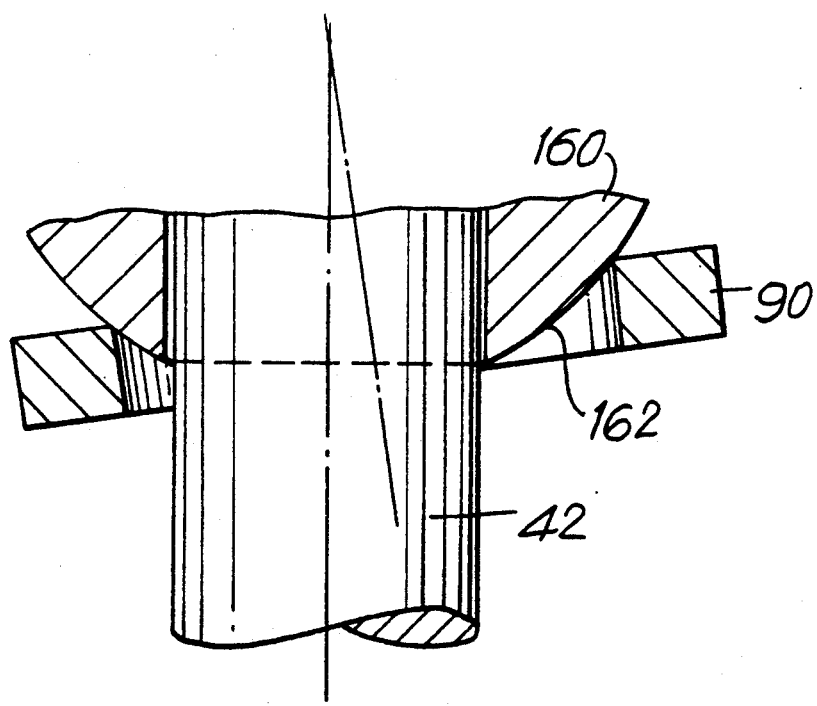
FIG. 7 is a partial sectional view showing an alternative embodiment of the base washer.

FIG. 7 depicts an alternative embodiment of the base washer. In particular, base washer 160 depicted in FIG. 7 includes a full rounded lower surface 162 rather than the truncated rounded surface depicted in FIG. 3. Lower surface 162 may also be knurled or otherwise scored to prevent rotation with respect to seat washer 90.

FIGS. 3 and 7 also depict the fact that the pressure exerted on flange 17 by screw 42 may cause rim 14 to rotate downwardly as depicted in phantom in FIG. 3. The usual area of rim flex is depicted between arrows A and B in FIG. 3. Outer lower surface 80 on base washer 60 or rounded surface 162 on base washer 160 in FIG. 7 allow for the degree of rim flex while maintaining the integrity of the present invention. Thus, the present invention is also operative with non-aligned and non-parallel surfaces.

Referring now to FIG. 8, an alternative embodiment of the present invention is depicted. In this embodiment, a conventional drum lug screw 200 is utilized. Upper washer 210 and base washer 220 effectively snap together to capture ball bearings 230 therebetween. Upper washer 210 includes an outer collar 212 and base washer 220 includes an inner collar 222 between which ball bearings 230 are captured. Lower surface 214 of washer 210 includes detents 216 as described above. A seat washer 250 is also provided. Head 202 formed as part of lug screw 200 will press against first washer 210 and prevent rotation thereof with respective to lug screw 200. Accordingly, this construction will operate in the same manner as that described above with reference to FIG. 3 but provides a more flexible approach for adaption to conventional drum lug screws.

FIG. 9 depicts an alternative embodiment wherein the upper surface of a base washer 60' includes opposing detents 63 each having opposing inclined surfaces to provide a tighter locking arrangement.

FIG. 10 depicts a discrete bearing separator or spacer 250 which may be used intermediate first washer 50 and base washer 60 to align and retain ball bearings 64. In this regard, bearing separator 250 includes a plurality of openings 252, each of which would receive a ball bearing 64. The thickness of separator 250 is selected to be slightly smaller than the diameter of the ball bearings to permit the ball bearings to rotate and contact the angled detent surfaces.

It is noted that the washers are preferably manufactured from a hardened steel and the ball bearings are preferably manufactured from stainless steel. While the present invention has been described for use in connection with a drum, it is noted that the invention is applicable wherever it is desirable to prevent the loosening of a screw caused by vibration or the like, yet which permits easy adjustment thereof. It is also noted that while the invention has been described with respect to only one drum lug, it would normally be provided on each of the plurality of lug screws around the drum shell periphery to prevent loosening of any of the lug screws which would otherwise have a deleterious effect on the drum sound. Note also that the first washer could be formed as part of the screw head in desired applications.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A screw stabilizer for selectively adjusting a first element with respect to a second element comprising a screw having a first end adapted to be supported by at least a portion of said first element and a second end having threads adapted to be selectively threaded to said second element, first and second opposing washers supported intermediate said first end of said screw and said at least a portion of said first element, said first washer having an inner surface facing said second washer, said inner surface having a plurality of radially extending detents thereon, and a plurality of ball bearings sandwiched intermediate said first and second washers to be selectively received in said detents to releaseably lock said screw in a desired position to prevent loosening of said screw.

2. The screw stabilizer as claimed in claim 1, wherein said each said plurality of radially extending detents includes opposing sloped surfaces defining a peak.

3. The screw stabilizer as claimed in claim 2, wherein said opposing sloped surfaces are essentially flat inclined walls.

4. The screw stabilizer as claimed in claim 3, wherein each essentially flat inclined wall includes an effective slope and the threads on said second end of said screw include a slope, the effective slope of each inclined wall being larger than the slope of said screw threads.

5. The screw stabilizer as claimed in claim 1, wherein said second washer includes an outer surface, at least a portion of said outer surface being curved.

6. The screw stabilizer as claimed in claim 5, wherein said outer surface is truncated.

7. The screw stabilizer as claimed in claim 5, wherein a portion of said outer surface is knurled.

8. The screw stabilizer as claimed in claim 5, wherein a portion of said outer surface is scored.

9. The screw stabilizer as claimed in claim 1, wherein said second washer presses against said at least a portion of said first element as said screw is tightened.

10. The screw stabilizer as claimed in claim 1, further comprising a seat washer intermediate said second washer and said at least a portion of said first element.

11. The screw stabilizer as claimed in claim 1, further comprising a cover for holding said first and second washers together.

12. The screw stabilizer as claimed in claim 11, wherein said cover includes an opening, said screw having an enlarged portion at the first end thereof extending in said opening.

13. The screw stabilizer as claimed in claim 1, wherein said first washer is formed integrally with said screw.

14. The screw stabilizer as claimed in claim 1, wherein said first and second washers snap lock together to capture said ball bearings therebetween.

15. The screw stabilizer as claimed in claim wherein said second washer includes an inner surface facing the inner surface of said first washer, said inner surface of said second washer including a plurality of radially extending detents thereon.

16. The screw stabilizer as claimed in claim 3, wherein said second washer includes an inner surface facing the inner surface of said first washer, said inner surface of said second washer including a plurality of radially extending detents thereon.

17. The screw stabilizer as claimed in claim 16, wherein each said plurality of radially extending detents on said second washer includes opposing sloped surfaces defining a peak, each said opposing sloped surface being an essentially flat inclined wall.

18. The screw stabilizer as claimed in claim 1, further comprising a bearing separator disposed intermediate said first and second washers, said separator having a plurality of holes therein for receiving said plurality of ball bearings therein.

19. The screw stabilizer as claimed in claim 18, wherein the thickness of said separator is smaller than the diameter of said ball bearings.

20. The screw stabilizer as claimed in claim 1, wherein said first washer is press fitted on said screw to rotate therewith.

21. The screw stabilizer as claimed in claim 20, wherein said second washer is rotatable with respect to said screw.

22. A screw stabilizer for selectively adjusting a first element with respect to a second element using a screw having a first end with an enlarged head for coupling to said first element and a second end with threads for screwing into said second element, comprising first and second opposing washers having openings therethrough to receive said screw, said first washer having an inner surface facing said second washer, said inner surface having a plurality of inclined surfaces thereon, and a plurality of ball bearings sandwiched intermediate said first and second washers to ride against said plurality of inclined surfaces.

23. The screw stabilizer as claimed in claim 22, wherein each inclined surface includes an effective slope and the threads on said second end of said screw include a slope, the effective slope of each inclined surface being larger than the slope of said screw threads.

24. The screw stabilizer as claimed in claim 22, wherein said second washer includes an outer surface, at least a portion of said outer surface being curved.

25. The screw stabilizer as claimed in claim 24, wherein said outer surface is truncated.

26. The screw stabilizer as claimed in claim 22, wherein said second washer will press against said first element as said screw is tightened.

27. The screw stabilizer as claimed in claim 22, further comprising a cover for holding said first and second washers together.

28. The screw stabilizer as claimed in claim 22, wherein said first and second washers snap lock together to capture said ball bearings therebetween.

29. The screw stabilizer as claimed in claim 22, wherein said second washer includes an inner surface facing the inner surface of said first washer, said inner surface of said second washer including a plurality of radially extending detents thereon.

30. A stabilizer for preventing undesired loosening of the lug screws coupling the rim of a drum to the shell of the drum, each said lug screw including a first end having an enlarged head and a second threaded end screwed to said shell, comprising a first washer fixed on the first end of said lug screw for rotation therewith, said first washer having an inner surface having a plurality of detents thereon, a second opposing washer on the first end of said lug screw and rotatable with respect thereto, a plurality of ball bearings intermediate said first and second washers, said first and second washers being captured intermediate said head of said lug screw and said rim of said drum to force said ball bearings to ride against said detents to releasably lock said lug screw in position.

31. The screw stabilizer as claimed in claim 30, wherein said each said plurality of detents includes opposing sloped surfaces defining a peak.

32. The screw stabilizer as claimed in claim 31, wherein said opposing sloped surfaces are essentially flat inclined walls.

33. The screw stabilizer as claimed in claim 32, wherein each essentially flat inclined wall includes an effective slope and the threads on said second end of said lug screw include a slope, the effective slope of each inclined wall being larger than the slope of said screw threads.

34. The screw stabilizer as claimed in claim 30, wherein said second washer includes an outer surface, at least a portion of said outer surface being curved.

35. The screw stabilizer as claimed in claim 30, further comprising a cover for holding said first and second washers together.

36. The screw stabilizer as claimed in claim 30, wherein said second washer includes an inner surface facing the inner surface of said first washer, said inner surface of said second washer including a plurality of radially extending detents thereon.

* * * * *